United States Patent

[11] 3,604,381

| [72] | Inventor | Lawrence L. Neidenberg<br>Claridge Drive, Verona, N.J. 07044 |
|---|---|---|
| [21] | Appl. No. | 832,149 |
| [22] | Filed | June 11, 1969 |
| [45] | Patented | Sept. 14, 1971 |

[54] POWER CABLE HANDLING DEVICE
2 Claims, 4 Drawing Figs.
[52] U.S. Cl. ............................................. 114/0.5, 254/175.5
[51] Int. Cl. ........................................... B63b 35/00
[50] Field of Search .......................................... 114/0.5; 226/49, 183; 254/175.5, 175.7

[56] References Cited
UNITED STATES PATENTS
1,865,069  6/1932  Allen............................ 254/175.5 X FOREIGN PATENTS
86,187  4/1936  Sweden........................ 254/175.5

Primary Examiner—Trygve M. Blix
Attorney—Kinzer, Dorn and Zickert

ABSTRACT: Device for handling heavy-duty electrical power cable for enabling storage of the cable in a storage compartment and the connection of the cable to a power source, and including a storage compartment into which the cable is stored in free form and out of which the cable is driven for connection to a power source. The cable drive means includes a power driven drive roller and suitable coacting rollers for maintaining the cable in driving engagement with the drive roller, and a reversible motor for powering the drive roller.

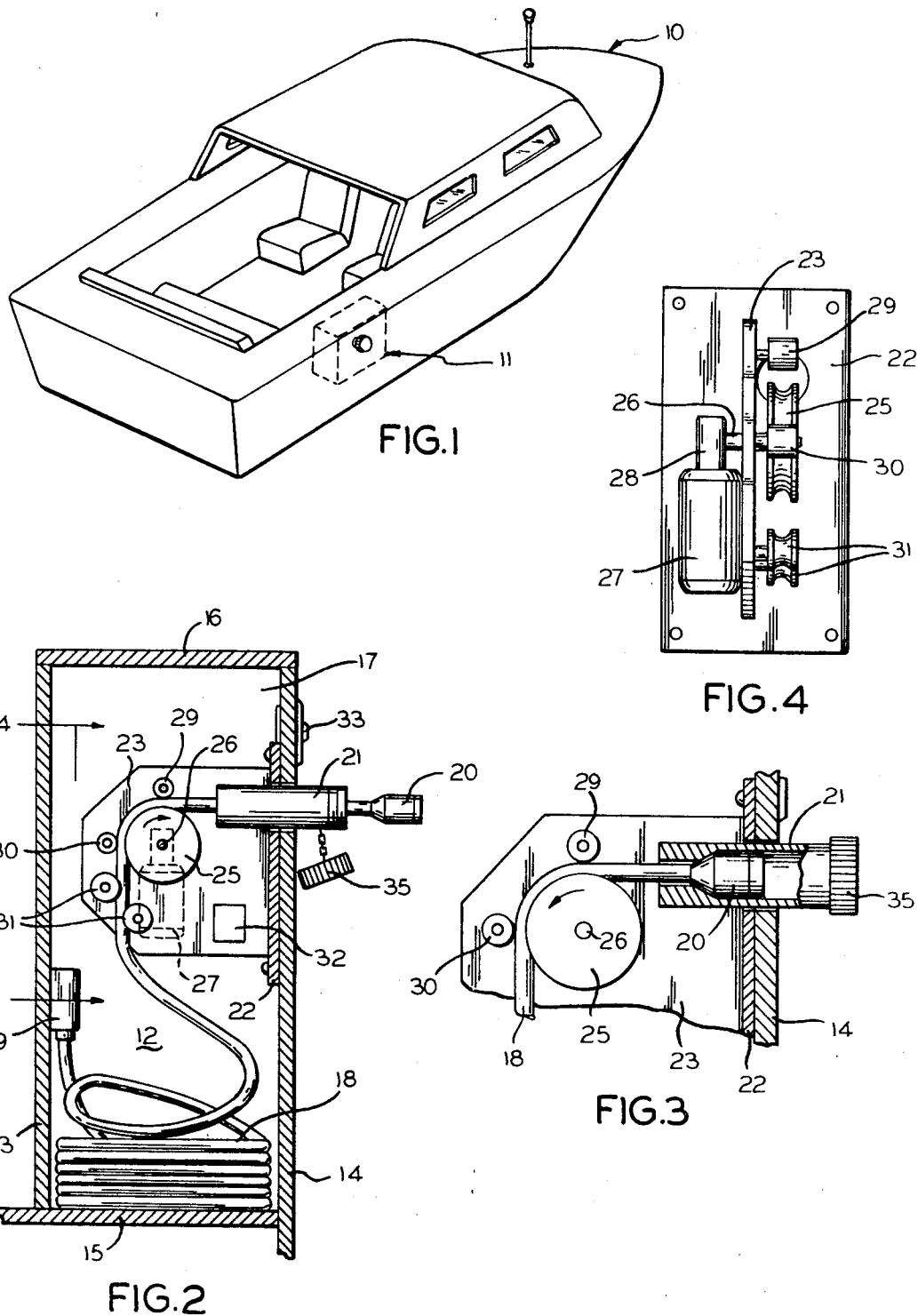

POWER CABLE HANDLING DEVICE

This invention relates in general to a device for handling heavy-duty power cables to facilitate their storage when not in use, and more particularly to a device for handling power cables used by mobile vehicles to enable same to connect to stationary power sources and to store the cable in the vehicle, and still more particularly to power cables employed to connect a power system of a boat to shore facilities while storing the cable during nonuse, although other uses and purposes will be apparent to those skilled in the art.

With the advent of higher power requirements for boats when using shore facilities, it has become necessary to employ heavy-duty electrical power cable which is difficult to handle manually, thereby necessitating the use of motive power to bring the cable aboard a boat for storage and to remove the cable from storage for connection to shore facilities. Present methods for storing and handling such heavy cable include the provision of a power driven drum upon which the cable may be wound. Such a method requires commutator rings on the drum for the transfer of electrical power between a shore power junction box on the boat and the cable on the drum. This method cannot be used on boats because commutators sometimes cause sparking which would be extremely dangerous and could lead to explosions in the event of a gasoline or vapor fume leak. Moreover, such a drum winding arrangement is cumbersome in size, subject to rusting because of its necessary steel structure and the humidity conditions, and causes the cable to take a "set" when left on the drum for long periods of time.

The present invention obviates the above difficulties by eliminating the need of a drum for storage of cable and the need for a commutator for the transfer of electrical power. Moreover, the cable handling device of the present invention is compact and reduces the weight and strain on the cable that is encountered with the drum method.

The cable handling device of the present invention includes a storage compartment on the boat or vehicle utilizing the power cable, and means for driving the cable into and out of the compartment according to the necessity of periodically connecting same to a stationary power source. The cable driving means includes a power driven roller over which the cable is trained and coacting idler rollers for maintaining the cable in driving engagement with the drive roller. A reversible motor is provided for powering the drive roller, and operable by suitable controls. The drive motor would be connected to a source of power in the boat or vehicle which is independent from the shore power facilities. One end of the cable is permanently attached to a junction box on the boat, while the other end includes a suitable electrical coupling for connection to a shore power outlet. When driving the cable into the storage compartment, the cable is allowed to fall freely into the compartment in a natural position thereby preventing the possibility of jamming when bringing the cable out of the compartment for use. It is apparent that no strain is imparted to the cable during the driving of same into and out of the compartment, and relatively little wear is experienced. While the invention will be ascribed in connection for use with a boat, it should be appreciated that it can be otherwise utilized, such as for any mobile vehicle needing electrical power at a designated place of operation. For example, a truck carrying portable TV and radio equipment uses large power cables, and in these instances it would be essentially desirable to eliminate any possible static noises that might occur with the use of commutators. Moreover, the invention may be employed in industrial plants where there would be a need to eliminate any possible sparking that might cause explosions.

It is therefore an object of the present invention to provide a new and improved heavy-duty electrical power cable handling device.

Another object of this invention is in the provision of a cable handling device that is essentially useful on boats and vehicles where it is desired to eliminate possible arcing and where it is needed for the handling of heavy-duty cable quickly and expediently to facilitate storage and connection to stationary power facilities.

A still further object of this invention is in the provision of a power cable handling device that is compact in nature and is capable of handling cable without causing excessive wear or strain thereon, and where cable when stored is allowed to fall naturally into a pile in a storage compartment.

Other objects, features and advantages of the invention will be apparent from the following detailed disclosure, taken in conjunction with the accompanying sheet of drawing, wherein like reference numerals refer to like parts, in which:

FIG. 1 is a perspective view of a boat, and illustrating in dotted lines the possible position of a cable storage compartment and cable handling device in accordance with the present invention;

FIG. 2 is a cross-sectional view taken through the storage compartment of the boat shown in FIG. 1 and illustrating the cable drive mechanism together with the piling of cable into the compartment, and also showing the cover removed from the hawse pipe and the coupling end of the cable in slightly extended position outside of the hawse pipe;

FIG. 3 is a detailed view of the hawse pipe illustrating the position of the coupling end of the cable when in storage position therein, and the cover in mounted position on the end of the pipe; and FIG. 4 is an elevational view of the cable driving means taken substantially along line 4—4 of FIG. 2.

Referring now to the drawings, a boat 10, shown in FIG. 1, illustrates a possible positioning of the cable handling device 11 according to the present invention. As already stated, the cable handling device may be employed wherever there is a need for handling heavy-duty power cable.

The cable handling device 11 includes a cable storage compartment 12 arranged in a convenient location within the boat and in this illustration along one side of the boat. As illustrated, the cable storage compartment 12 is defined by inner and outer bulkheads 13 and 14 that constitute inner and outer upstanding walls of the compartment, the main deck 15 constituting the bottom wall, an upper wall 16 and opposed walls 17. As illustrated, the shore power cable 18 may be stored within the compartment 12 or removed therefrom to enable connection to shore power facilities. One end of the cable 18 is electrically connected to a shore power junction box 19 mounted on the inner bulkhead 13 and from which shore power may be distributed to the required areas in the boat. The other end of the cable includes a suitable electrical coupling 20 to facilitate connection to a shore power outlet.

In order to facilitate the movement of the power cable 18 into and out of the compartment 12, a tubular member or hawse pipe 31 is mounted in the outer bulkhead 14 and extends substantially perpendicular thereto and from the inner and outer surfaces of the outer bulkhead 14. Preferably the hawse pipe may be secured by a bulkhead mounting plate 22 that is secured flat against the inner surface of the outer bulkhead 14, and to which is secured an inwardly extending mounting plate 23 that supports the cable driving device 24. The inwardly extending mounting plate 23 preferably extends substantially perpendicular to the bulkhead mounting plate 22 and substantially vertical along one side of the inner end of the hawse pipe 21.

The cable driving device 24 includes a large main drive roller 25 rotatably supported on one side of the mounting plate 23 by a shaft 26. A reversible electric motor 27 having a reduction gear assembly 28 is suitably mounted on the other side of the mounting plate 23 and drivingly connected to the shaft 26 of the drive roller 25. The outer periphery of the drive roller is preferably concavely formed to receive the cable. Moreover, the drive roller may be of variable pitch to facilitate receiving cable of varying sizes. A pair of idler rollers 29 and 30 are rotatably mounted on shafts supported by the mounting plate 23 adjacent the periphery of drive roller 25 to guide and maintain the cable in driving engagement with the drive roller 25 and to bend the cable partially around the roller. The periphery of the drive roller is tangentially positioned relative to the opening of the hawse pipe 21. The exterior surfaces of the idler rollers 29 and 30 may be flat as shown or convex.

In order to properly guide the cable 18 into and out of the compartment to prevent jamming, a pair of coacting guide and positioning rollers 31 are rotatably supported on shafts extending from the mounting plate 23 in a position to receive the cable tangentially relative to the drive roller 25 and to guide the cable substantially directly downwardly into the compartment. These rollers are preferably adjustable to vary the direction the cable is to advance therebetween if necessary. The outer peripheries of these rollers are convexly formed as illustrated to properly maintain the cable moving along a desired path. Moreover, these rollers are freely rotatable and arranged not to tightly engage the cable but to loosely engage the cable and facilitate guiding movement with the minimum amount of frictional resistance.

An electrical junction box 32 may be mounted on the mounting plate 23 for connecting the motor 27 to the boat electrical power supply and for the connection to a switch control 33 mounted on the outside surface of the outer bulkhead 14. The switch control is of a suitable waterproof type and facilitates the operation of the cable driving device 24 from the outside of the boat. It should be appreciated that the switch control may be mounted in any suitable location and that it may even be composed of a plurality of a parallel connected switches to facilitate operation of the cable-driving device from different locations.

While the compartment 12 is illustrated as being above the main deck of the boat, it should be appreciated that it could be located below the main deck in the engine room if so desired, and in that event, suitable cable guiding means would be provided to assure proper guiding of the cable into and out of the compartment and through the hawse pipe. It is apparent that the hawse pipe 21 would be located at a suitable height along an outer bulkhead to facilitate the accessibility of the cable when desiring to connect same to a shore power supply. However, the hawse pipe could be mounted in a horizontal panel or bulkhead.

The electrical coupling 20 on the outer end of the cable 18 would preferably be of a size that would freely fit within the hawse pipe, and to facilitate handling, a stop 34 may be provided within the hawse pipe to prevent the coupling end of the cable from being withdrawn through the inner end of the hawse pipe. A hawse pipe cover 35 is provided for closing the outer end of the hawse pipe watertight when the coupling is stored therein and the cable is stored in the compartment 12 to prevent water leakage into the compartment.

In operation, when it is desired to connect the power cable 18 to a shore power outlet, the hawse pipe cover 35 would be removed and the switch control 33 operated to drive the cable out of the compartment and through the hawse pipe a sufficient amount to enable connection to the shore power outlet. The cable would be removed from the compartment by driving it through the cable drive device 24. Connection of the coupling 20 to the shore power outlet would immediately provide shore power for the boat. When it is desired to disconnect the shore power and store the cable, upon disconnection of the electrical coupling 20 from the shore power outlet, the switch control 33 would be operated to drive the cable back through the hawse pipe and into the compartment. The cable would fall freely into the compartment and attain a natural position that would cause little, if any, strain of wear thereon. When the coupling is positioned within the hawse pipe, the cover could be applied to close the outer end of the hawse pipe.

It will be understood that modifications and variations may be effected without departing from the scope of the novel concepts of the present invention.

The invention is hereby claimed as follows:

1. In combination with a boat requiring shore power when docked, apparatus for handling heavy-duty shore power cable comprising a cable storage compartment in the boat adjacent an outer bulkhead for receiving the cable in loose form during storing of same, a shore power junction box in the compartment for electrically connecting the cable thereto, a hawse pipe in said outer bulkhead extending clear of both sides, means on the outer end of the cable for facilitating connection to a shore power outlet, drive means mounted within said compartment for driving the cable in and out of the compartment and through the hawse pipe, said drive means including a mounting plate secured to the outer bulkhead, a drive roller over which the cable is trained the outer periphery of which is tangentially positioned to said hawse pipe, idler rollers coacting with the drive roller to maintain same in driving engagement therewith, guide rollers for guiding the cable as it comes off the drive roller for guiding same into a loose pile in the storage compartment, a reversible motor drivingly connected to said drive roller and electrically connected to the boat power, and a waterproof switch on the outer surface of the bulkhead for controlling the motor.

2. The combination as defined in claim 1, and a waterproof cover for the hawse pipe when the cable is in the storage compartment.